(12) United States Patent
Codilian

(10) Patent No.: US 6,738,220 B1
(45) Date of Patent: May 18, 2004

(54) SERVO SETTLING BY UTILIZATION OF A BIAS TORQUE OFFSET VALUE WHICH DEPENDS ON THE MEMORY OF PREVIOUS SEEK OPERATIONS

(75) Inventor: Raffi Codilian, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 235 days.

(21) Appl. No.: 09/967,790

(22) Filed: Sep. 28, 2001

(51) Int. Cl.$^7$ .............................................. G11B 5/596
(52) U.S. Cl. .................................. 360/78.04; 360/78.07
(58) Field of Search .......................... 360/78.04, 77.04, 360/77.05, 78.07, 78.09, 77.02, 256.1

(56) References Cited

U.S. PATENT DOCUMENTS

| | | | | |
|---|---|---|---|---|
| 5,128,813 A | * | 7/1992 | Lee | 360/78.07 |
| 5,319,511 A | * | 6/1994 | Lin | 360/256.1 |
| 5,751,513 A | * | 5/1998 | Phan et al. | 360/78.07 |
| 5,872,674 A | | 2/1999 | Eddy | |
| 5,886,846 A | * | 3/1999 | Pham et al. | 360/78.04 |
| 6,594,106 B1 | * | 7/2003 | Serrano et al. | 360/78.09 |
| 6,606,214 B1 | * | 8/2003 | Liu et al. | 360/77.02 |

\* cited by examiner

*Primary Examiner*—David Hudspeth
*Assistant Examiner*—Fred F. Tzeng
(74) *Attorney, Agent, or Firm*—Milad G. Shara, Esq.; Knobbe Martens Olson & Bear

(57) ABSTRACT

A disk drive control system that compensates for mechanical bias torques present in disk drives. A transducer, commonly referred to as a head, is attached to an actuator arm that is subjected to mechanical bias torques, including flex bias torque and bearing friction. The net bias torque has a mechanical memory that is manifested as hysteresis whose magnitude depends on the size of the stroke length between inflection points of the transducer in seek operations. The dependence of the net bias torque includes location of the transducer, direction of the seek, and the history of previous seeks. The dependence may further include operating temperature of the disk drive. The disk control system determines and applies these corrections to the disk drive to enhance the seek performance.

31 Claims, 14 Drawing Sheets

SERVO SETTLING BY UTILIZATION OF A BIAS TORQUE OFFSET VALUE WHICH DEPENDS ON THE MEMORY OF PREVIOUS SEEK OPERATIONS

BACKGROUND OF THE INVENTION

1. Field of the Invention

The present invention relates to computer data storage devices and, in particular, relates to a hard disk drive having an actuator controller that accounts for the bias torque on the actuator.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost. However, because the computer industry continually strives to provide computer systems with increased performance, there exists a need for improved disk drives having increased data access speeds.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk and data is written to or read from each track by positioning the transducer over the disk at the corresponding radius while the disk is rotated at a fixed angular speed.

To position the transducer with respect to the disk, the typical hard disk drive further comprises a head stack assembly (HSA) that includes a transducer, a pivotally mounted actuator arm for supporting the transducer, a voice coil motor (VCM) for exerting a torque onto the actuator arm, and a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil which results in the permanent magnet applying a force onto the coil which is then transferred to the actuator arm in the form of a torque. Because the direction of the torque is dictated by the direction of control current flow, the servo-controller is able to reposition the transducer by first directing the control current through the coil so as to angularly accelerate the actuator arm in a first direction and then reversing the control current so as to angularly decelerate the actuator arm.

The HSA further comprises a pivot bearing and a thin flexible cable know as "flex cable". The pivot bearing provides the pivotal support of the actuator arm while allowing precise rotational motion. The flex cable provides an interconnect between the transducer and the disk control circuitry. The flex cable is attached to the actuator arm, and is allowed to flex and unflex as the actuator arm moves back and forth.

The time required to reposition the transducer in the foregoing manner is known as the "seek time" of the drive and is an important performance factor that affects the throughput of the drive. For example, a drive having a short seek time will be able to access a requested track of data more quickly than a drive having a longer seek time. According the state of the art, the seek time required to reposition the transducer across a distance of 0.8–0.85 cm is typically in the range of 5–10 ms.

In a typical seek operation, the transducer accelerates, coasts, and decelerates according to the predetermined control of the current applied to the VCM. The transducer, through a feedback control, typically requires some settling time to settle on the proper target track. Once the transducer is on the proper track, a track following bias current is provided to the VCM in order to maintain tracking. The bias current is necessary to counteract a bias torque that is continuously exerted on the actuator arm.

The bias torque comprises any torque acting on the actuator arm, other than the torque due to the control current in the VCM (control torque). A torque on the actuator arm from the spring property of the flex cable is one potential source of such bias torque. For example, the flex cable may be stretched when the actuator arm moves in one direction, and squeezed when the actuator arm moves in the other direction thereby affecting the control torque on the actuator arm. Friction is another factor that contributes to the bias torque on the actuator arm.

Typically, the magnitude of the bias torque is much smaller than that of the control torque. As such, the bias torque is not significant when the control torque is being applied to the actuator arm for gross movements. During the settling phase and track following, however, small amounts of currents are applied by the VCM in a prescribed manner to make the transducer settle on the target track and maintain the track following thereafter. In these realms of operation, the effects of bias torque can become significant, especially in higher density drives.

In practice the bias torque is usually not characterized analytically, but measured. The feedback control system measures the current required by the VCM to counter the bias torque on the actuator arm so as to maintain the transducer at a given track. A plurality of such measurements are made at various locations on the disk, and the resulting curve yields the bias torque as a function of track location.

The bias torque curve as a function of track location is not unique. That is, bias torque measured when the transducer is moving from inner diameter side to the outer diameter side yields a first curve. Bias torque measured when the motion is in the opposite direction yields a second curve that typically does not retrace the first curve. When a full range of motion is made from the inner most track to the outer most track, and then back to the inner most track, the resulting bias torque measurements yield two distinct sets of curves, with the two curves joined at the inner most and the outer most points. This behavior resulting in the loop shape is known as hysteresis. Hysteresis is a phenomenon where a measured quantity depends on the direction of a process.

Hysteresis in general is caused by a "memory" of a system that makes certain aspects of the system to lag behind. In the case of the actuator arm, the memory comes from the mechanical memories of either the flex cable or the pivot bearing or both. That is, a bias torque depends on the recent history of the flex cable and/or the pivot bearing. If the actuator arm comes to a stop at a given track, it will feel a certain bias torque based on the memory of the previous movements, the memory including the direction of travel.

Hysteresis in bias torque is further complicated by its dependence on the size of a seek loop. A full seek loop is when the transducer goes from the inner most track to the outer most track, and returns to the inner most track. A smaller seek loop comprising a small length seek and its reverse, yields a smaller hysteresis loop that is nested within the larger full seek loop. Progressively smaller seek loops yield smaller hysteresis loops that are nested within the larger loops.

To achieve optimal seek performance, the controller must account for the bias torque and adjust the control current to the VCM. If the proper adjustment is not made, the transducer can overshoot or undershoot the target track sufficiently to cause a delay in settling, thus increasing the seek time. Thus, there is a need to adjust the control current to the VCM according to the bias torque acting on the actuator arm.

One possible solution is to consider only the average bias torque. Averaging of the bias torque hysteresis loop will yield a single bias torque curve as a function of track location (nominal bias curve). An X-Y lookup table can be used to correlate bias torque (Y) to track number (X), and the result from this single lookup table can be used by the servo controller to adjust the control current. This method is sufficient if the hysteresis effect is small, or if the delay due to the hysteresis effect during the settling phase is within an acceptable limit.

Another solution is proposed in U.S. Pat. No. 5,872,674 to Eddy and assigned to Seagate Technology, Inc., USA. In this patent, a control system takes into account not only the track location, but also seek direction, previous seek direction, and current seek length to determine the adjustment value needed to offset the bias torque. In this method, the seek direction parameter determines whether the bias torque to be encountered is on the top or bottom of the hysteresis loop. The previous seek direction parameter determines whether the last seek operation used the bias torque offset value from the top or bottom of the hysteresis loop. The current seek length determines the magnitude of the hysteresis loop to be encountered. The location parameter determines the nominal bias torque to be encountered at the target track location.

The solution proposed by Eddy has a drawback of relying on parameters associated only with the last operation and the operation to be done. By definition, hysteresis is caused by the memory of the system, and that memory may last longer than the time elapsed between the last operation and the current operation. As an example, suppose that the actuator arm has performed a series of seek operations, all of them involving short seek lengths. It then does a long seek length operation as the most recent operation. The current seek operation to be done involves a short seek length. The memory of the Eddy system will most likely be in a state such that the system is used to doing short length seeks, and the single long seek operation will most likely not erase that memory. The control logic cannot distinguish this history from that involving a series of long length seek operations, including the most recent one. As such, the logic's output based only on the most recent and the current operations may not be indicative of the actual bias torque. In particular, relying only on the current seek length and the most recent seek direction may not accurately represent many of the possible bias torque that the actuator arm experiences.

It is desirable to be able to determine the bias torque offset value accurately. In some disk drives high accuracy is not required in determining the bias torque offset, due to the actuator arm being sized such that the hysteresis effect is essentially negligible when compared to the moment of inertia of the actuator arm. The current trend in the disk drive market, however, is toward smaller drives. A physically smaller disk drive will have a smaller actuator arm and also a smaller VCM, such that the bias torque will become more significant when compared to the actuator arm's moment of inertia and the control torque. Thus, an accurate system of determining the bias torque offset becomes increasingly important.

From the foregoing, it will be appreciated that there is a need for improved system for determining the bias torque offset value to improve the seek performance of the disk drive. To this end, there is a need for a system that accurately determines the bias torque offset based on the parameters of the operation to be performed, as well as the parameters from the history of the previous operations.

SUMMARY OF THE INVENTION

In one aspect of the invention, a hard disk device comprises a rotatable disk having a magnetic recording media wherein the rotatable disk defines a plurality of concentric servo tracks. The hard disk further comprises a pivotable actuator that is movable with respect to the rotatable disk. The pivotable actuator is subject to a first bias force that has a history component which varies at least in part, based upon the history of previous movements of the pivotable actuator. The hard disk further comprises a transducer positioned on the actuator so as to be movable with respect to the disk so as to be positionable on a selected servo track of the plurality of concentric servo tracks. The hard disk further comprises a controller that induces bias outputs to be applied to the pivotable actuator during positioning of the actuator. The controller induces a first bias output to be applied to the actuator to position the actuator with respect to the rotatable disk so as to position the transducer on a selected servo track of the plurality of servo tracks. The controller monitors at least one inflection length that is defined as the total number of tracks traversed during a plurality of seek operations between changes in direction of the pivotable actuator and determines the magnitude of the first bias output by determining a first magnitude value indicative of the approximate bias needed to position the actuator so as to position the transducer on the selected servo track, then offsets the first magnitude value by a history offset value that corresponds to the history component of the first bias force exerted on the actuator. The history offset is determined based upon the monitored at least one inflection length.

In one embodiment of the hard disk device, the controller induces the application of the first bias output during a seek operation that moves the transducer from a first position over a first servo track to a second position over a second servo track. The first bias output settles the actuator in the second position such that the transducer is positioned over the second servo track.

The hard disk device further comprises a memory having a plurality of location bias values stored therein. The memory is used by the controller to determine the first magnitude value of approximate bias needed to position the actuator so as to move the transducer from the first position over a first servo track to the second position over the second servo track. The memory includes a first X-Y look up table wherein the location bias values are plotted versus location.

In one embodiment of the hard disk device, the location bias value depends on the operating temperature of the hard disk device. Parameters that define temperature dependence of the location bias value are stored in the memory as a look up table.

The memory also includes a direction offset value stored therein that the controller uses to adjust the location bias value in obtaining the magnitude of the first bias output. The direction offset value is representative of the direction of movement of the actuator during the selected seek operation.

The memory further includes a plurality of history offset values stored therein that are indicative of the offset values used to offset the first magnitude value so as to at least partially offset the history component of the first bias force exerted on the pivotable actuator. The controller uses the location bias value, the direction offset value and the history offset value to obtain the magnitude of the first bias output needed for a selected seek operation.

The history offset value reduces the magnitude of the adjustment of the direction offset value to the location bias value for the selected seek operation. The memory further comprises a second X-Y look up table that correlates the history offset values versus a weighted average of the inflection lengths of the plurality of previous seek operations. The history offset value plotted versus the weighted average of the inflection lengths has a negative value for at least a portion of the second X-Y look up table so as to diminish the effect of the adjustment of the direction offset value to the location bias value. The history offset value has a zero magnitude for seek lengths greater than a pre-selected length.

In one embodiment of the hard disk device, the controller induces the application of the first bias output during track following immediately subsequent to the seek operation. The first bias output counteracts the first bias force on the pivotable actuator and maintain the transducer in a position over the servo track.

To apply the first bias output during track following, the hard disk device further comprises a memory having a plurality of location bias values stored therein that is used by the controller to determine the first magnitude value of approximate bias needed to maintain the actuator over the servo track. The memory includes the first X-Y look up table wherein the location bias values are plotted versus location.

In one embodiment of the hard disk device, the location bias value used during track following depends on the operating temperature of the hard disk device. Parameters that define temperature dependence of the location bias value are stored in the memory as a look up table.

The memory also includes a direction offset value stored therein that the controller uses to adjust the location bias value in obtaining the magnitude of the first bias output. The direction offset value is representative of the direction of movement of the actuator during the selected previous seek operation.

The memory further includes a plurality of history offset values stored therein that are indicative of the offset values used to offset the first magnitude value so as to at least partially offset the history component of the first bias force exerted on the pivotable actuator. The controller uses the location bias value, the direction offset value and the history offset value to obtain the magnitude of the first bias output needed for the selected track following operation.

The history offset value reduces the magnitude of the adjustment of the direction offset value to the location bias value for the selected track following operation. The memory further comprises the second X-Y look up table that correlates the history offset values versus a weighted average of the inflection lengths of the plurality of previous seek operations. The history offset value plotted versus the weighted average of the inflection lengths has a negative value for at least a portion of the second X-Y look up table so as to diminish the effect of the adjustment of the direction offset value to the location bias value. The history offset value has a zero magnitude for previous seek lengths greater than a pre-selected length.

Another aspect of the invention relates to a method of adjusting the position of an actuator having a transducer positioned thereon with respect to a selected servo track of a rotating hard disk. The method comprises assessing a plurality of previous seek operations wherein the actuator has moved the transducer from one servo track to another to determine a history offset value corresponding to a history component of a first bias force exerted on the actuator. The history component varies, at least in part, based on the history of previous movements of the pivotable actuator.

The method further comprises determining an initial magnitude value of a bias output needed to be applied to the actuator to position the transducer over the selected servo track. The method further comprises adjusting the initial magnitude value of the bias output by the history offset value to obtain a first bias output, and applying the first bias output to the actuator so as to position the transducer over the selected servo track.

Applying the first bias output to the actuator counteracts the first bias force acting on the actuator during settling of the transducer over the selected servo track during a seek operation. The first bias output also counteracts the first bias force acting on the actuator during track following immediately subsequent to the seek operation.

Determining the initial magnitude value of the bias output comprises determining the initial magnitude value's dependence on the location of the selected track, and the direction of the seek operation. The initial magnitude of the bias output further depends on the operating temperature.

Assessing the plurality of previous seek operations comprises monitoring and weighted averaging at least one inflection length that is defined as total number of tracks traversed during a plurality of seek operations between changes in direction of the actuator. The weighted average of the inflection lengths is indicative of the history offset value.

From the foregoing, it should be apparent that the use of history offset value improves the performance of the hard disk during seek and track following operations. These and other objects and advantages of the invention will become more apparent from the following description taken in conjunction with the accompanying drawing.

DETAILED DESCRIPTION OF THE PREFERRED EMBODIMENT

Figure 1:
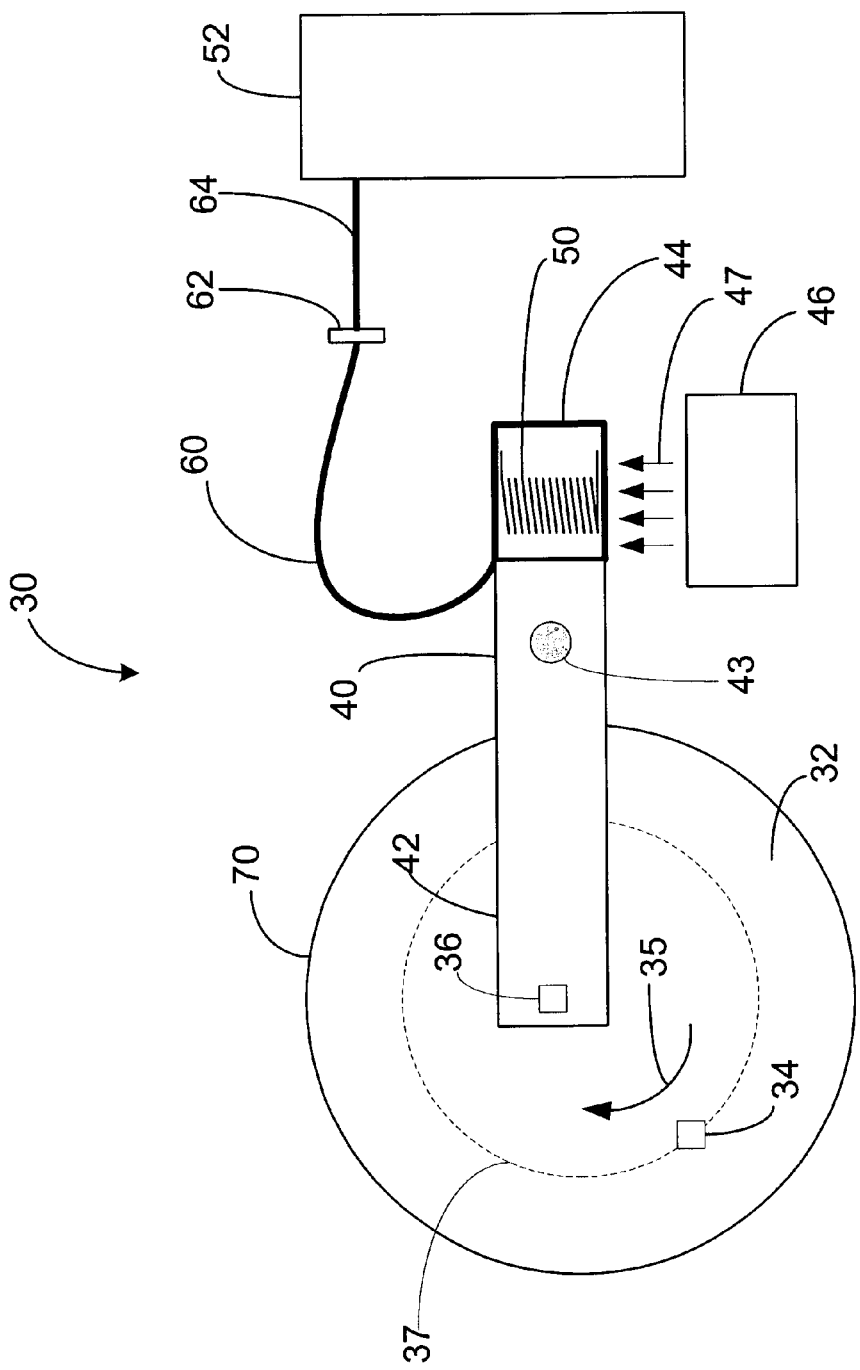
FIG. 1 is a schematic diagram illustrating a hard disk drive.

Reference will now be made to the drawings wherein like numerals refer to like parts throughout. FIG. 1 schematically illustrates a hard disk drive 30 for storing information according to one aspect of the present invention. The hard disk drive comprises a magnetic medium 32 having a plurality of magnetic domains 34 disposed therein such that the magnetization states of the domains 34 define the information stored on the hard disk drive 30. A plurality of the domains 34 are arranged in concentric circles called tracks 37, one of which is illustrated in FIG. 1. The medium 32 is preferably disposed on one or more disk-shaped members 70. The drive 30 further comprises a transducer 36 for affecting and sensing the magnetization states of the magnetic domains 34 and an actuator 40 for disposing the transducer 36 over the magnetic medium 32 and for moving the transducer 36 between positions over the medium 32.

The actuator 40 comprises a pivotally mounted actuator arm 42 coupled to the transducer 36, an actuator coil 44 coupled to the actuator arm 42, and a magnetic field source 46, such as a permanent magnet, that produces a magnetic field 47 for exerting forces onto the coil 44 when current flows through the coil 44. The arm 42 is able to pivot about a pivot point 43 in a plane parallel to a recording surface of the magnetic medium 32 such that the arm 42 is able to sweep across a substantial portion of the recording surface. The coil 44 comprises a conducting wire wound into a plurality of loops and, thus, defines a conducting path 50 such that a current flowing through the conducting path 50 interacts with the magnetic field 47 of the magnetic source 46 to exert forces onto the coil 44. Consequently, the actuator arm 42 experiences a net torque in response to the current flowing through the coil 44 which angularly accelerates the actuator arm 42 causing the arm 42 to pivot about the pivot point 43 and, thus, linearly accelerates the transducer 36 from an initial state of rest into a state of motion with respect to the field source 46. Furthermore, in response to the coil current flowing in the opposite direction, the actuator arm 42 experiences a torque that subsequently brings the transducer 36 to a state of rest at a new position with respect the medium 32.

The hard disk drive further comprises a flex cable 60 that carries electrical signals to and from the actuator 40, including data to and from the transducer 36 and the current to the actuator coil 44. The flex cable 60 is attached to the actuator arm 40 as well as a flex cable attachment point 62. FIG. 1 illustrates an interconnect 64 that connects a control system 52 to the flex cable 60 such that the control system 52 controls the motion of the actuator 40. The flex cable 60 is flexible so as to have limited effect on the rotating motion of the actuator 40. When the exemplary actuator 40 rotates clockwise about the pivot point 43 in FIG. 1, the flex cable 60 uncurls. Similarly, the flex cable 60 curls up when the actuator 40 rotates counterclockwise about the pivot point 43. Because of the bent configuration of the flex cable 60, the flex cable 60 exerts a torque on the actuator 40 causing an effect described below.

The rotational motion of the actuator 40 is further affected by a friction at the pivot point 43 such that the friction opposes the rotation of the actuator 40. The friction and the torque from the flex cable 60 are two components of a bias torque that the actuator 40 experiences. In general, the bias torque comprises an aggregate of torques on the actuator 40 other than the toque due to the controlled application of the current to the actuator coil 44. Offsetting the bias torque for precise motion of the actuator is described below.

The control system 52 controls the current that flows through the coil 44. When a request is received by the drive 30 that requires repositioning the transducer 36 to a different position, the control system determines a desired current profile, such as that shown in FIG. 2, and directs current with the desired profile to flow through the coil 44 using techniques that are well known in the art. In particular, a forward current is driven through the coil 44 starting at T0 and ending at T1. During this period, the forward current angularly accelerates the actuator arm 42 at a rate which is proportional to the amplitude of the forward current until the time T1 such that the actuator arm 42 reaches a maximum angular speed. During a time period T1 to T2, the current to the coil 44 is disabled and the actuator arm is coasting at a generally constant angular velocity towards it second orientation. This period is typically referred to as a dwell period. Starting at a time T2, a reverse current is driven through the coil 44 so as to decelerate the actuator arm 42 at a rate which is proportional to the amplitude of the reverse current until the reverse current is switched off at a time T3 such that the transducer 36 is positioned substantially near a desired final position. A time period between T3 and T4 is typically known as a settling period, during which several iterations of small adjustments to the current are made to center the transducer 36 over the desired final position.

Figure 2:
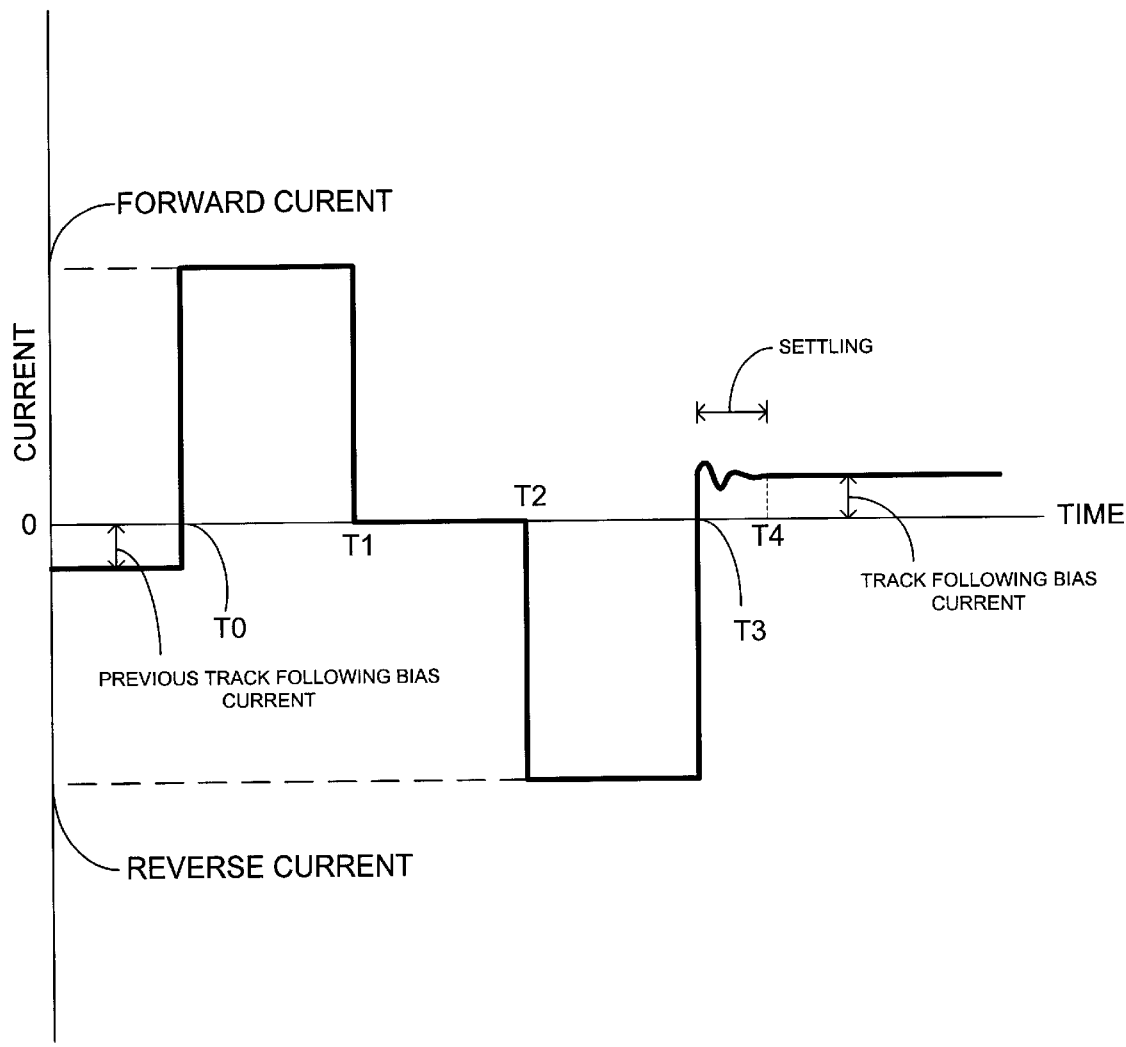
FIG. 2 is a diagram illustrating a typical current consumption curve of a voice coil motor as it performs a typical seek operation.

FIG. 2 further illustrates track following bias currents applied to the actuator coil 44 to compensate for the bias torque on the actuator 40. Prior to the time T0, a small negative bias current is applied to the coil 44 in order to maintain the transducer over the prior track. After the time T3, a small positive bias current is applied to the coil 44 in order to maintain the transducer 36 over the present track. The magnitudes of the bias currents are exaggerated in FIG. 2. Typically, the bias current magnitude is much smaller than the magnitude of the forward or reverse current. Furthermore, the sign of the bias current (positive or negative) depends on the location of the transducer, and FIG. 2 depicts one possible combination of bias currents encountered.

A seek time is a time required to move the transducer 36 from one track to another track, and is equal to T4–T0. One way of reducing the seek time is to adjust the applied current profile shown in FIG. 2 so as to reduce the dwell time as well as the settling time. The settling time can also be reduced if the bias torque values are known precisely such that proper amounts of track following bias currents are applied.

Figure 3:
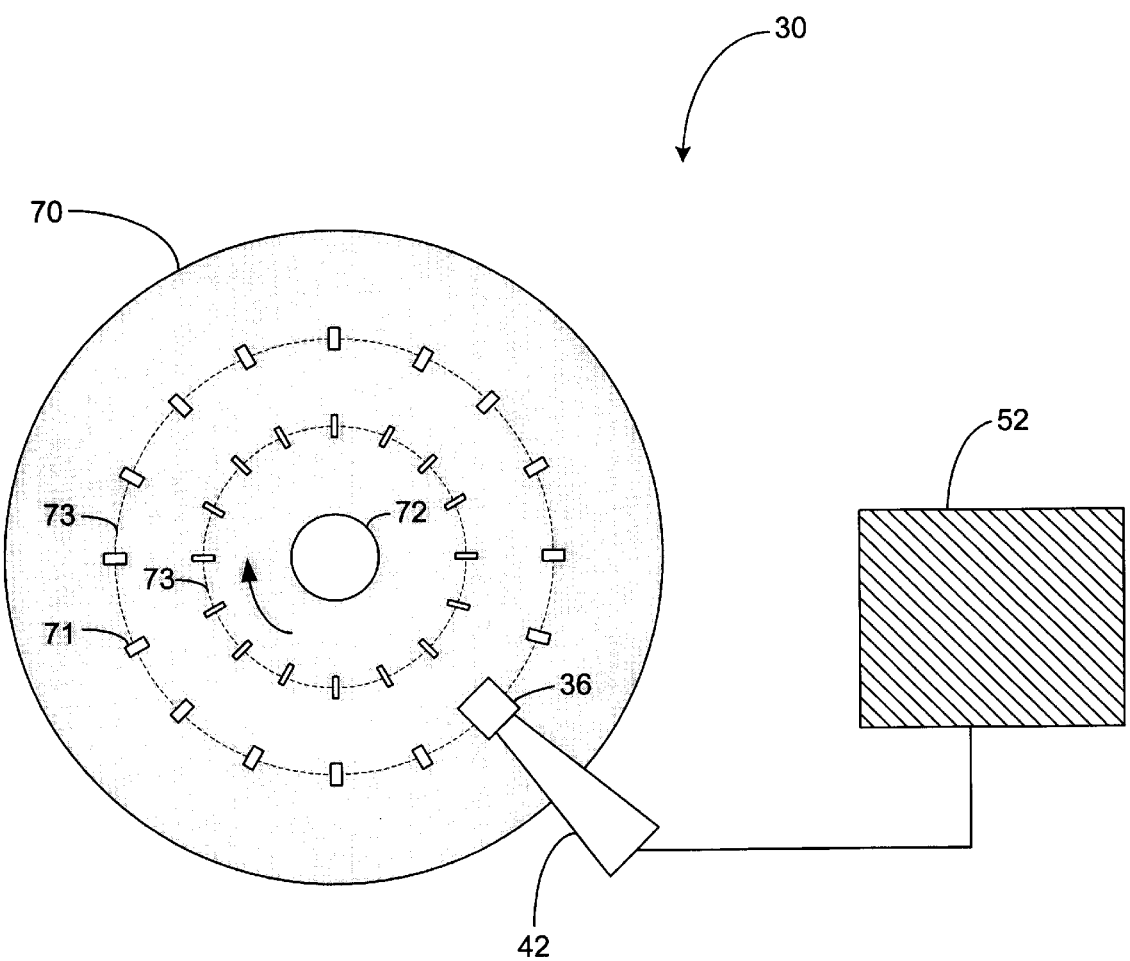
FIG. 3 is a schematic illustration of a typical disk of the hard disk drive of FIG. 1.

FIG. 3 is a schematic illustration of a typical disk 70 of the hard disk drive 30 that has a plurality of servo wedges 71 formed thereon. The servo wedges 71 are used to maintain the transducer 36 over a given track 73. As is understood in the art, the disk 70 is mounted on a spindle 72 such that the disk 70 is rotated by the spindle 72 at a relatively high RPM, e.g. in some implementations at 7200 RPM. The servo wedges 71 define a servo track 73 which is used by a control system implementing a servo-controller function to monitor the present location of the transducer 36 with respect to the magnetic media 32 formed on the surface 30 of the disk 70. In one typical implementation, there are a total of 128 servo wedges in a servo track.

The transducer 36 generates a servo-wedge interrupt at the control system 52 each time a servo wedge 71 is detected. In this way, the control system 52 is continually provided information about the present location of the transducer 36 with respect to the disk 70 and can use this information in a known manner to adjust the positioning of the actuator arm 42 to ensure that the transducer 36 is correctly positioned during track following and seeking. As will be described in greater detail below in reference to FIG. 4, the control system 52 is receiving a servo wedge interrupt at a relatively high frequency, e.g., for a disk having 64 servo wedges per servo track and rotating at 7200 RPM, the frequency of the control system receiving a servo interrupt will be on the order of 7.6 kHz.

Figure 4:
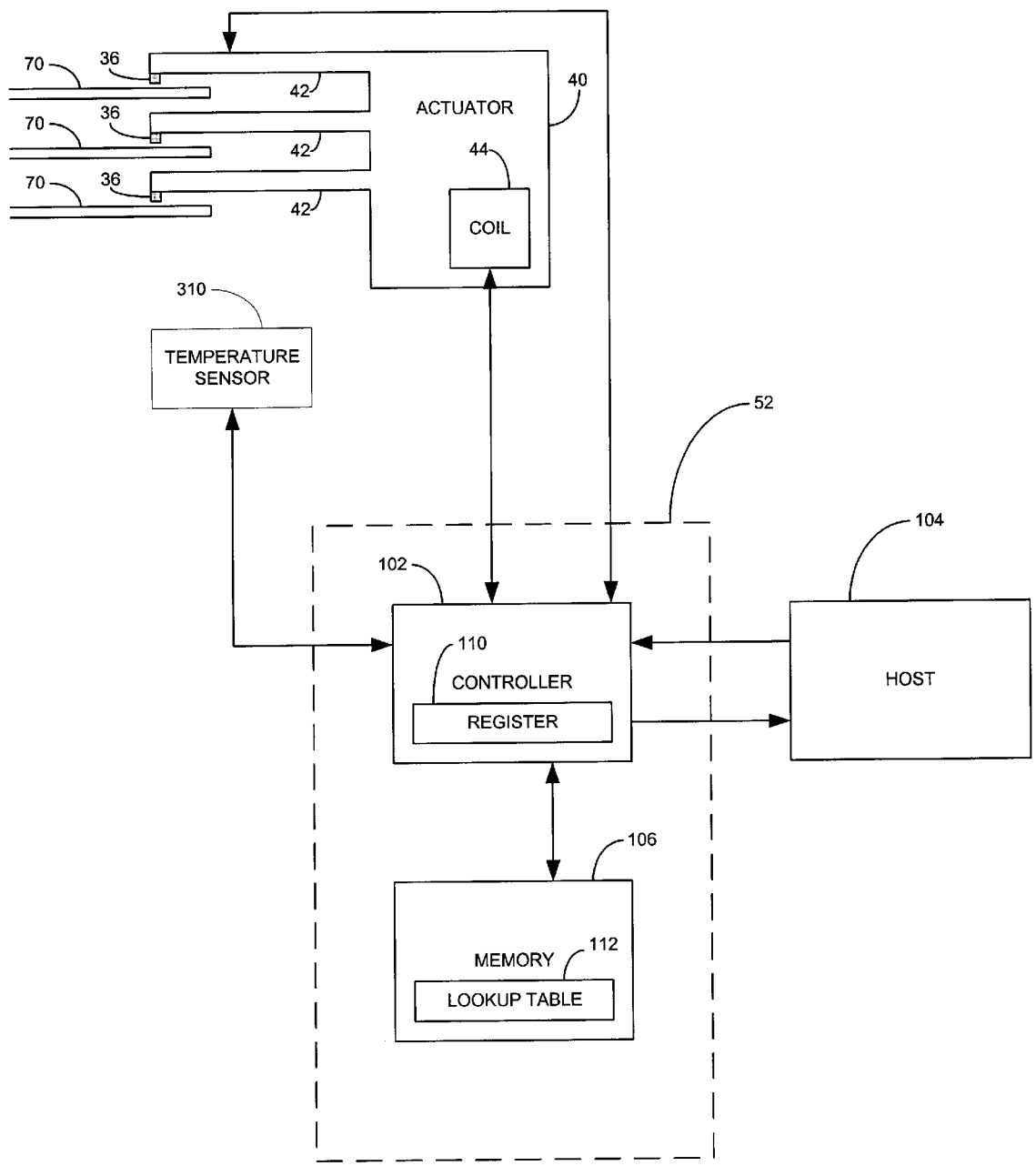
FIG. 4 is a schematic functional block diagram illustrating the functional components of the hard disk drive of FIG. 1.

FIG. 4 is a simplified functional block diagram illustrating the control system 52 and its interrelation between the actuator 40 that moves the actuator arms 42 so as to be able to access particular locations on the magnetic media 32 and the interrelation between the actuator control 52 and a host 104. As is illustrated in FIG. 4, the hard disk 30 typically includes the plurality of disks 70 with an actuator 40 and a plurality of actuator arms 42. The control system 52 is thus adapted to control the actuator 40 and the actuator arms 42 in the manner described in greater detail below.

In particular, the control system 52 is logically organized to include a controller 102 that includes the functionality of a servo controller which is well known in the art, and controls the positioning of each actuator arm 42 and the transducer 36 over the magnetic media 32 in order to read or write data from particular locations on the magnetic media 32. The controller 102 receives the servo wedge interrupts from the transducer 36 and uses these interrupts to control the positioning of the transducer 36 with respect to the magnetic media 32 of the disk 70 in a known manner. The controller 102 also receives signals from the host 104 that induces the controller 102 to send signals to the actuator coil 44 so as to induce the movement of the actuator arm 42 to reposition the transducer 36 with respect to the disk 70 during a seek operation in a known manner.

The controller 102 also includes the functionality to be able to either retrieve or send data between the magnetic media 32 and a host system 104. In this aspect, the controller 102 may include preamplifiers which amplify signals from the transducers 36, a read/write channel that encodes and decodes data either read from or written to the magnetic media 32 of the disk 70, a disk controller which responds to the format of and provides error detection for the correction of disk data, and an interface controller with an associated interface that allows for interconnection and transfer of data between the host 104 and the magnetic media 32. The exact implementation of the manner in which data is transferred between the magnetic media 32 and the host 104 can be performed in any of a number of known implementations without departing from the spirit of the present invention.

In one embodiment, a single controller 102 is adapted to have the functionality of both a known servo controller and a disk controller. In some disk drive implementations, there are two separate controllers. In other implementations, one controller provides the functionality of both the servo controller and the disk controller. It will be appreciated from the following discussion that the process for efficiently determining the amount of bias torque on the actuator 40 and accordingly adjusting the seek operation of the disk drive can be implemented in any of a number of different types and configurations of controllers without departing from the spirit of the present invention.

As mentioned in the background section of this paper, the actuator 40 experiences the bias torque which, if not compensated, can increase settling times and cause track following problems. To compensate for the bias torque, the control system 52, and in particular, the controller 102, determines a bias torque compensation value in a manner that will be described in greater detail below and thereby alters the operation of the coil 44 so as to improve the seek performance.

FIG. 4 further illustrates a temperature sensor 310 that permits the control system 52 to monitor the operating temperature of the disk drive. In one embodiment, the operating temperature of the disk drive affects the bias torque compensation value in a manner described below.

Figure 5:
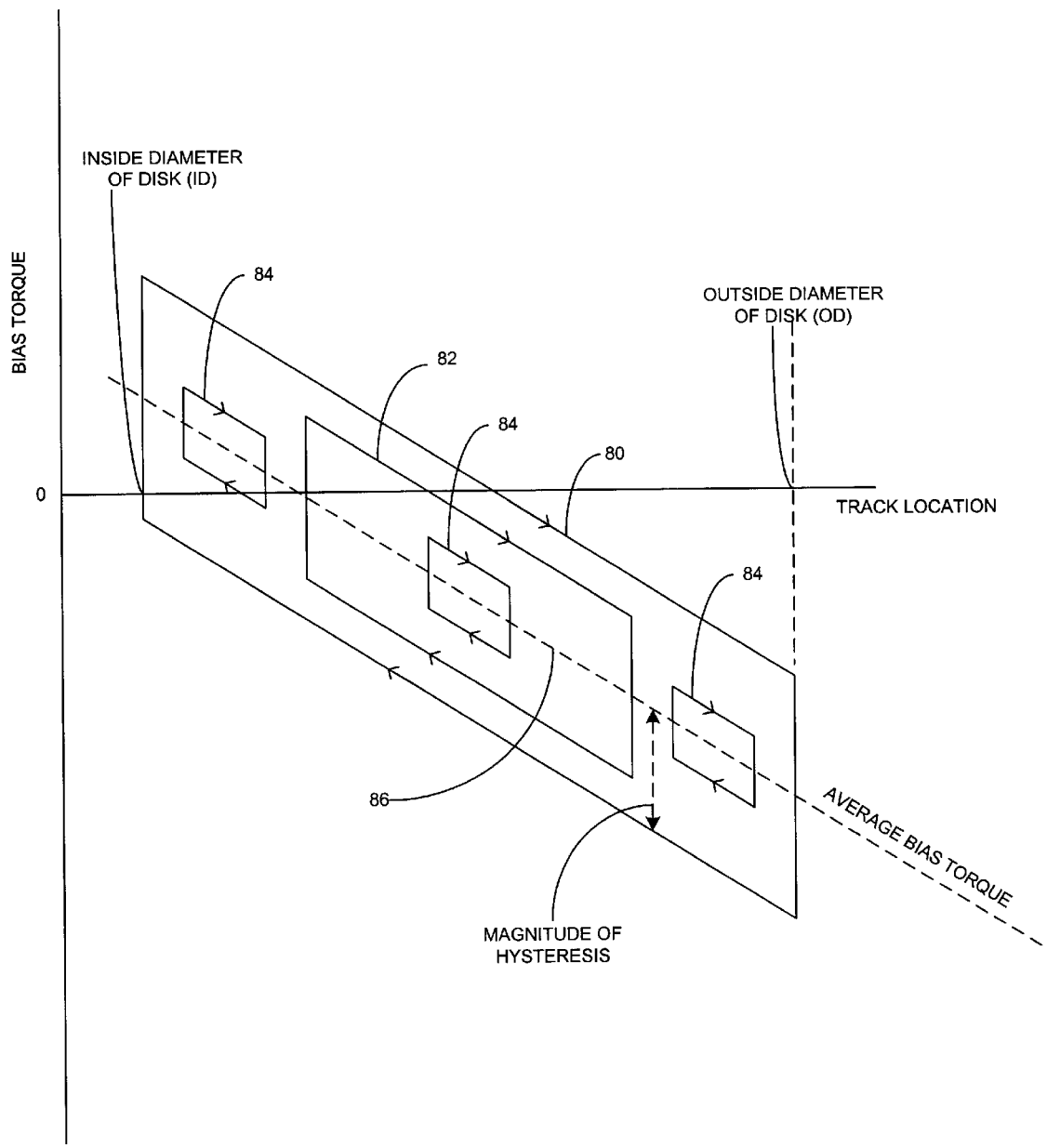
FIG. 5 is an exemplary plot of a bias torque applied to an actuator of the hard disk drive, wherein the bias torque is a function of location and displays hysteresis whose magnitude depends on the size of the strokes that a transducer undergoes during a seek operation.

FIG. 5 illustrates an exemplary plot of the bias torque exerted on the actuator 40. As referred to in the background section, the bias torque displays the hysteresis effect when a seek loop is performed. To generate the seek loop, segments of seeks are performed and data is collected while moving the actuator arm 42 such that the transducer 36 moves from a first track location to a second track location, and back to the first track location. This move may be completed in either a single move or in a plurality of segments. A long seek loop 80 depicts the full stroke seek loop operation for the disk 70, as the transducer 36 moves from the inside diameter (ID) to the outside diameter (OD) and back to the ID. The arrows on the long seek loop 80 indicates the direction of motion of the transducer 36. As the transducer 36 moves towards the OD, the actuator experiences the bias torque represented by the upper portion of the long seek loop 80. The lower portion of the long seek loop 80 represents the bias torque that the actuator experiences as the transducer 36 moves towards the ID. A magnitude of hysteresis, as illustrated in FIG. 5, is the difference between the upper portion and the lower portion of the loop. Hysteresis in the bias torque is caused by the memory of the mechanical components that contribute to the bias torque. For example, when the flex cable 60 is bent from a first configuration to another configuration, releasing the flex cable 60 does not cause the flex cable 60 to return exactly to the first configuration.

FIG. 5 further illustrates a medium seek loop 82, as well as a plurality of short seek loops 84. The short seek loop 84 is nested within the medium seek loop 82, which in turn is nested within the long seek loop 80. In general, as related to the art, the magnitude of hysteresis becomes smaller as the seek length becomes smaller. It will be understood that the bias torque loops illustrated represent a first and a second motion such that the second motion is an opposite to the first motion so as to form a path loop.

The long, medium, and short seek loops 80, 82, and 84 depicted in FIG. 5 are typically obtained when each of the respective seek loop operations are repeated. Furthermore, it will be understood that the loop sizes illustrated represent only three of the many possible hysteresis loop sizes. While such constant seek length loops illustrate the hysteresis effect well, they typically do not represent the real seek operations where seek length and direction are changing frequently. As such, the magnitude of hysteresis also changes accordingly in a non-trivial manner. Thus, it will be appreciated that a sequence of seek operations involving changes in both seek lengths and seek directions affect the bias torque compensations in a manner described below.

FIG. 5 further illustrates an average bias torque curve. This curve is substantially common to all of the bias torque loops shown, and represents the average of the upper and lower portions of the loop. The average bias torque curve is the basis for a first order correction in the compensation method described below.

The bias torque diagram depicted in FIG. 5 is an example of the bias torque that exists in hard disk drives. The upper portion of the bias torque loop does not have to represent motion towards the OD. The direction of the hysteresis loop can be opposite to that illustrated without departing from the spirit of the invention. Furthermore, the placement of the bias torque curves relative to the vertical axis is again an example. One type of hard disk drive may have all of the bias torque on the positive side, while another type may have all of the bias torque on the negative side. FIG. 5 shows an example where the bias torque can be either positive or negative. The actual values of the bias torque depends on the particular type of disk drive, and in particular, the configuration of the flex cable 60, pivot point 43, and any other components that contribute to the bias torque. It will be appreciated that the exemplary bias torque described above describes the problem to be solved without loss of generality.

Figure 6:
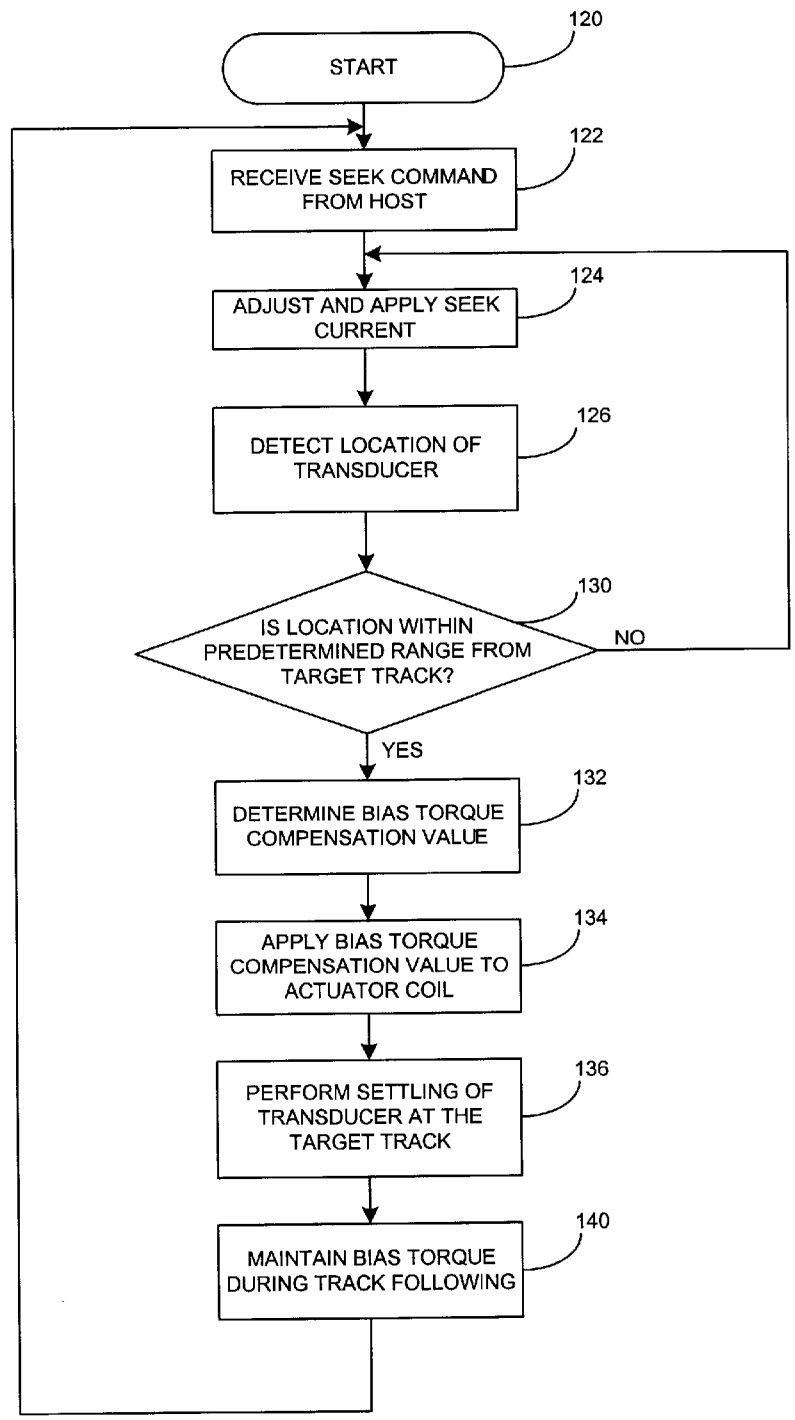
FIG. 6 is a flow chart that illustrates a seek operation that moves the transducer from a first location to a second location.

FIG. 6 is an exemplary flow chart which illustrates the operation of the controller 102 as it performs a seek process that accounts for the bias torque described above and illustrated in FIG. 5. The controller 102 begins the seek process from a start state 120. As is understood in the art, and illustrated by a state 122, the controller 102 receives a seek command from the host 104 where the host 104 is requesting information to be read from or written to the disk 70. In state 124, the controller 102 adjusts and sends the seek current to the actuator coil 44 in a manner described in detail above and illustrated in FIG. 2. As referred to above, the magnitude of the seek current is much larger than the current needed to offset the bias torque. As such, the bias torque compensation signal (current) is typically not applied during the gross movement phase of the seek. As the actuator 40 rotates, the transducer 36 moves across the tracks 37 towards the target location. In state 126, the controller 102 detects the location of the transducer 36 by detecting the servo wedges 71 on the servo tracks 73 as described above in reference to FIG. 3.

The controller 102 determines, in a decision state 130, whether the location of the transducer 36 is within a predetermined range from the target track 37, the range typically being 15 to 20 tracks. If the location of the transducer 36 is not within the predetermined range ("NO" decision in state 130), the controller 102 returns to the state 124 for another iteration states 124, 126, and 130 described above. Upon determining that the location of the transducer 36 is within the predetermined range ("YES" decision in state 130), the controller 102 initiates the bias torque compensation by determining the bias torque compensation value in state 132 in a manner described in detail below. The bias torque compensation value obtained in state 132 is applied to the actuator coil 44 in state 134.

The controller 102, now with the transducer being in close proximity to the target track 37, and with the proper bias torque compensation, performs the settling process that is well known in the art, and illustrated as state 136. The proper bias torque compensation aids in the fine tuning of the position of the transducer 36 over the track 37. Once the transducer 36 is settled on the target track 37, the bias torque compensation signal is still applied so as to maintain the track following in state 140. The controller 102 remains in state 140 until a new seek command is received from the host 104.

Figure 7:
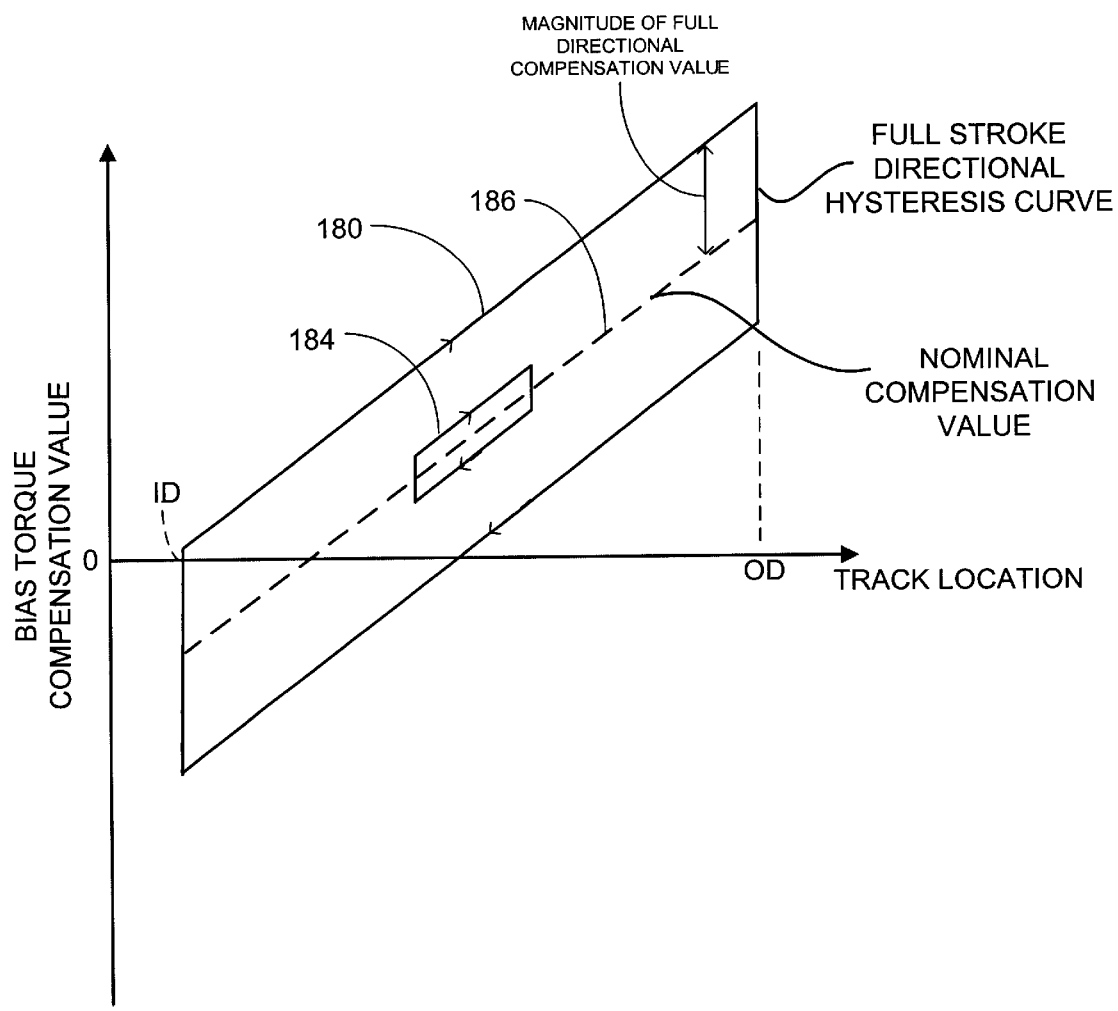
FIG. 7 is an exemplary plot of bias torque compensation value that can offset the bias torque of FIG. 5.

The bias torque compensation value determined in the state 132 of the flowchart in FIG. 6 is a function of track location, seek direction, and seek length, as illustrated in FIG. 7. Furthermore, the bias torque compensation value, also depends on the history of previous seek operations, similar to the bias torque's dependence on the history. The bias torque compensation value is the amount of torque necessary to substantially offset the bias torque illustrated in FIG. 5. As such, the bias torque compensation value plot in FIG. 7 is essentially a reflection of the bias torque plot in FIG. 5. The bias torque compensation values are expressed in units that allows the control system 52 to adjust the control signals sent to the actuator coil 44 in a manner known in the art.

It is common in the art to characterize the effect of torque in terms of a torque factor $K_T$ defined as an amount of torque applied to the actuator 40 per unit of input control current. The torque factor of the actuator coil 44 $K_{Tcoil}$ is determined by the strength of the magnetic field 47, number of turns in the conducting path 50, location of the coil 44 relative to the pivot point 43 (lever arm), and the moment of inertia of the actuator 40. The torque factor of the bias torque $K_{Tbias}$ is determined mainly by the mechanical properties of the flex cable 60 and the pivot point 43, as well as the lever arms of bias forces that cause the bias torques. Ideally, the $K_{Tbias}$ should be as small as possible and the $K_{Tcoil}$ as large as possible within the operating constraints. In many hard disk drives 30 in use at the present, the $K_{Tcoil}$ is indeed much larger than the $K_{Tbias}$. As the hard disk drives 30 become smaller, however, the actuator coils 44 become smaller as well, such that the ratio $K_{Tbias}/K_{Tcoil}$ increases. It will be appreciated that when this ratio increases, proper compensation of the bias torque becomes more critical for optimal seek performance.

As mentioned above, many hard disk drives 30 in use at the present have very small values for the ratio $K_{Tbias}/K_{Tcoil}$. As such, only a first order correction is performed to compensate for the bias torque. The first order correction comprises obtaining the bias torque compensation value based on the nominal compensation value curve illustrated in FIG. 7. In one embodiment, an X-Y look-up table 112 (in FIG. 4) is used, where the look-up table 112 correlates the nominal compensation value (Y) to the track location (X), the track location being the target track location as the transducer 36 moves from a track location to the target track location. The X-Y lookup table typically resides in the memory 106 of the control system 52.

A second order correction to compensate the bias torque deals with the directionality of the seek. As illustrated in FIGS. 5 and 7, the hysteresis loops have upper portions corresponding to seeks directed outward, and the lower portions corresponding to seeks directed inward. The second order correction determines the direction of the seek, and introduces an additional bias torque compensation value offset to the first order correction described above. The second order correction comprises a offset that is the difference between the upper portion of the full stroke curve and the nominal curve for the bias torque compensation value. This difference is substantially same as the difference between the nominal curve and the lower portion of the full stroke curve. In the exemplary system illustrated in FIGS. 5 and 7, the second offset value is added to the first offset value if the seek direction is outward. Conversely, if the seek direction is inward, the second offset is subtracted from the first offset value. The second offset value is typically stored in the memory 106 of the control system 52 in a manner known in the art.

It will be appreciated that the second order correction described above uses the full stroke hysteresis curve and does not take into account the smaller hysteresis magnitudes encountered by smaller seek operations. As such, the second offset over-corrects for the direction dependence when seek length is small.

A third order correction takes into account the smaller hysteresis effect when seek loops are smaller. Since the hysteresis depends on the seek length and the mechanical memory (history) of the system, the third order correction is a non-constant value that can be determined in a manner described below.

Figure 8A:
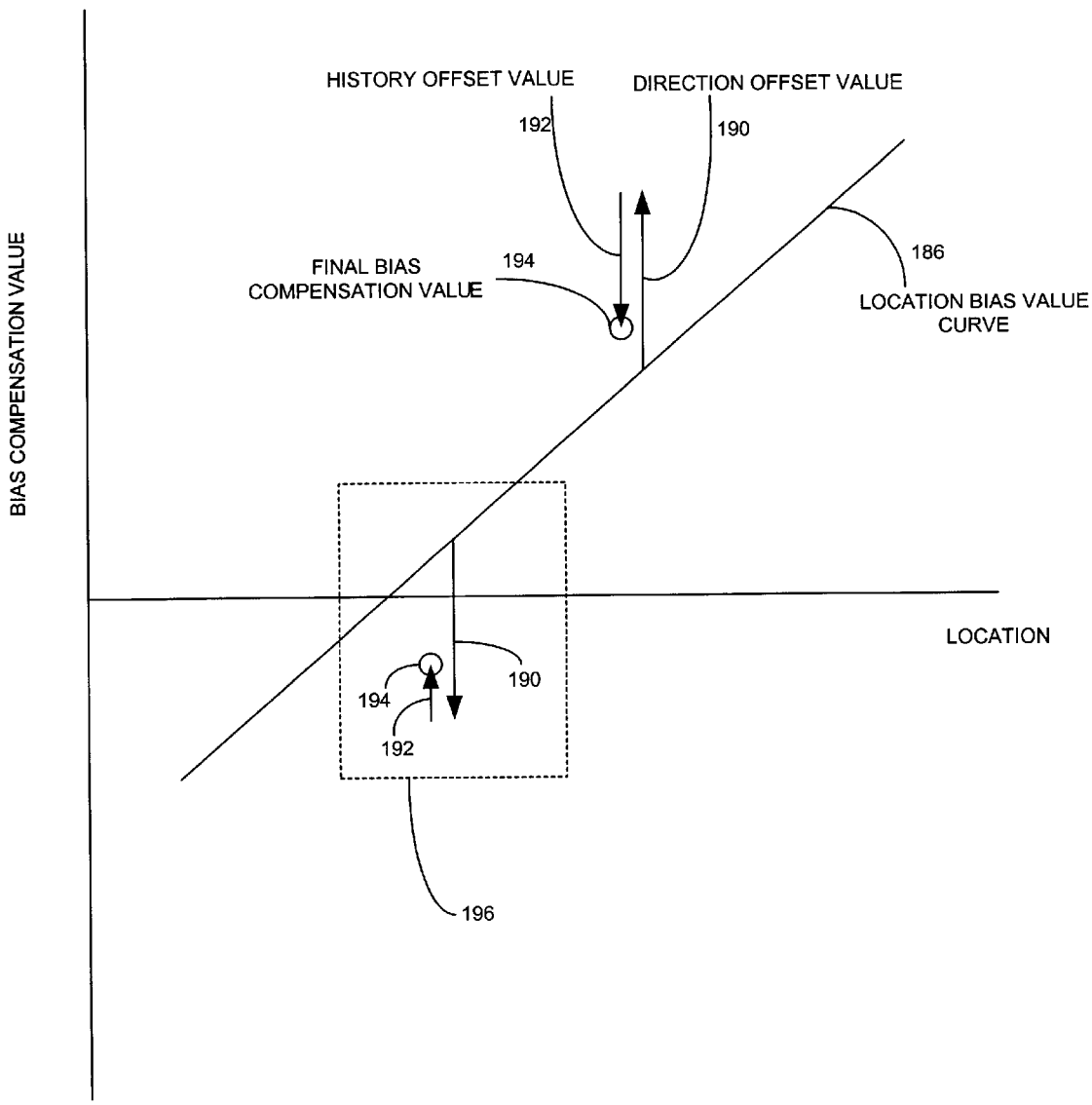
FIG. 8A illustrates determination of a final bias compensation value that includes a location bias value, a direction offset value, and a history offset value.

FIG. 8A illustrates the determination of the final bias (torque) compensation value that includes first, second, and third correction values. The first order correction value is obtained from a location bias value curve 186 that can be stored as an X-Y lookup table in the memory 112 (FIG. 4). From the location value curve (at the target location), a direction offset value 190 (second order correction) is added. In this example, the direction offset value 190 is added when the seek direction is outward. A history offset value 192 (third order correction) is then subtracted from the sum of first and second corrections to derive a final bias compensation value 194. It is the final bias compensation value 194 that is applied to the actuator 40 to offset the bias torque effects.

FIG. 8A further illustrates another correction sequence 196 for an inward seek operation. The direction offset value 190 is subtracted from the location value curve 186. From the resulting value, the history offset value 192 is added to arrive at the final bias compensation value 194.

The method of determining the bias compensation value described herein, and in particular in reference to FIG. 8A, derives at the desired value by series of adding and/or subtracting various correction values to an initial value. Hence, terms such as 'offset' and 'subtract' are used in the description. It will be appreciated that the addition/subtraction method described herein is exemplary, and is not intended to limit the spirit of the invention. It will be appreciated that the bias compensation value may be implemented in any number of ways, including using a multiplicative adjustment factor. Thus, it will be understood that the use of the term 'offset' herein means adjustment or adjusting, and is not limited to adding or subtracting.

Figure 8B:
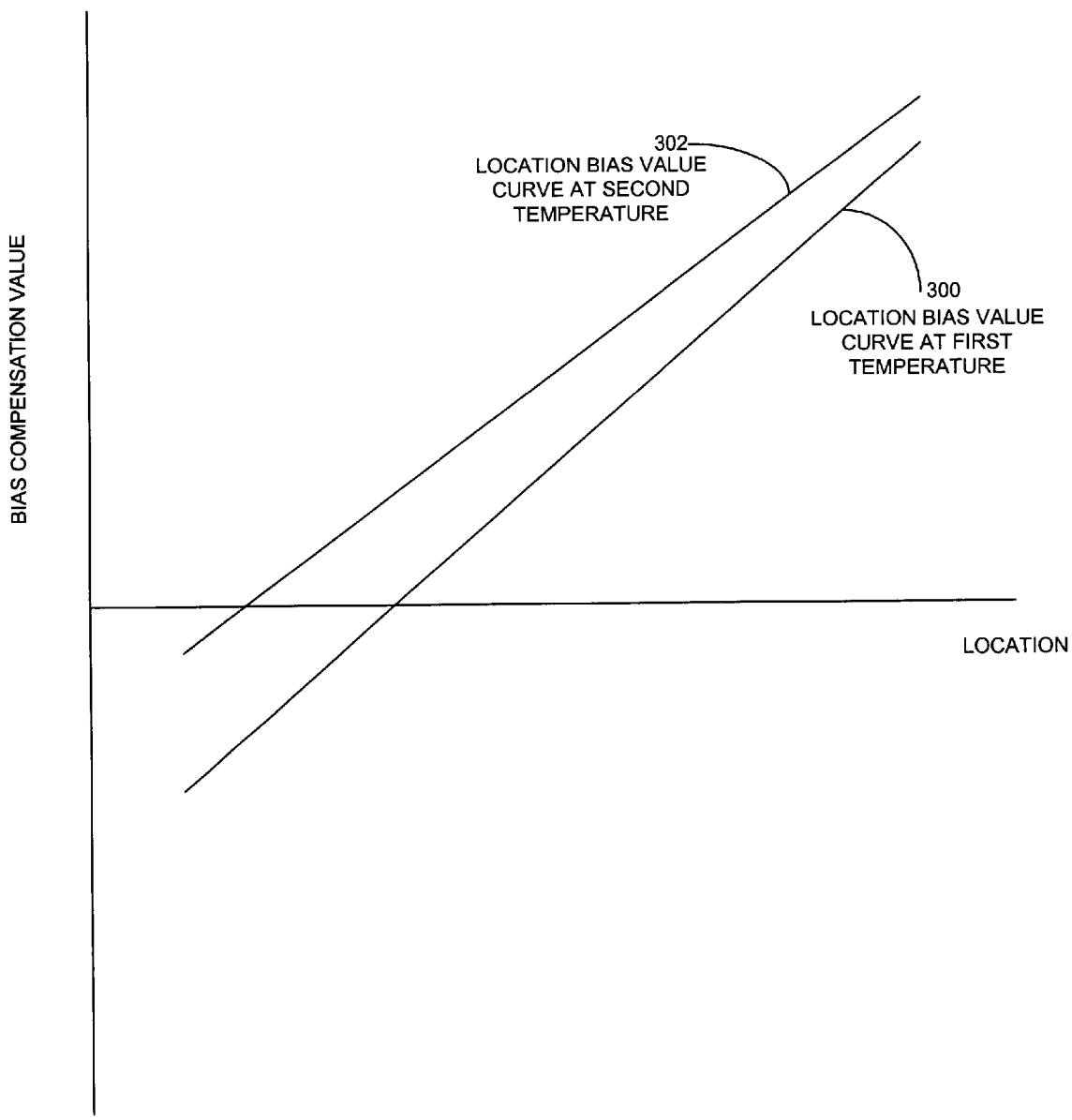
FIG. 8B illustrates an exemplary temperature dependence of the location bias value.

FIG. 8B illustrates an exemplary temperature dependence that may exist in the location bias value. A first curve 300 represents the location bias value as a function of location when the disk drive is at a first temperature. A second curve 302 represents the location bias value as a function of location when the disk drive is at a second temperature. It will be appreciated that the first and second curves 300 and 302 may differ in both the slope and the Y-intercept (shifted), depending on the implementation of the disk drive and the operating condition.

It will be understood that the location bias value referred to hereinafter is assumed to be adjusted for temperature dependence. In one embodiment, the control system 52 (FIG. 4) determines the operating temperature from the temperature sensor 310, and determines the adjustments to the slope and/or the Y-intercept of the location bias value. In one embodiment, these two adjustment values are stored in the lookup table 112 of the control system 52.

Figure 9:
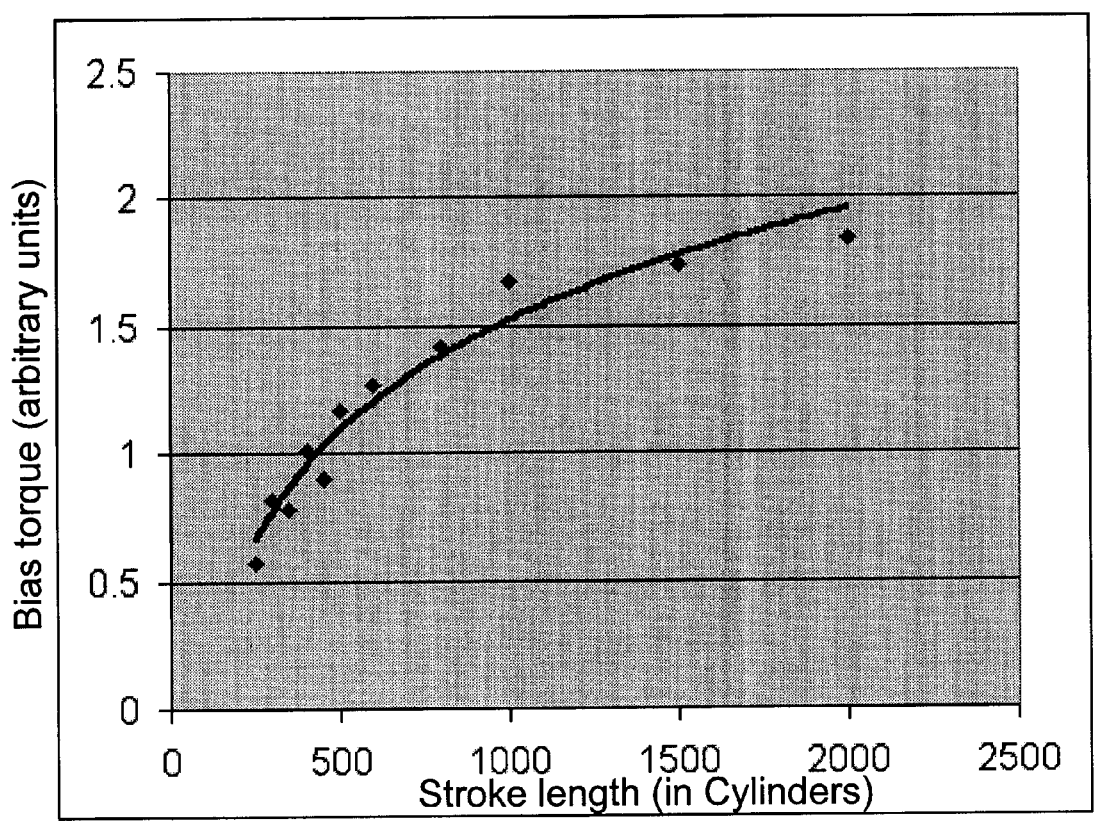
FIG. 9 illustrates a measured bias torque as a function of stroke length.

FIG. 9 illustrates a plot of measured bias torque as a function of stroke length (seek length) for a given disk drive. The bias torque on the Y axis is expressed in arbitrary units, but can be normalized to suit the third order correction described above. The plot comprises data points 200 and a fit curve 202. The data points 200 are average values of four different disk drive samples.

The fit curve 202 illustrates how the magnitude of hysteresis increases as the stroke length increases. It can be seen, however, that the fit curve 202 approaches an asymptotic maximum past the stroke length of approximately 2000 on a disk with a total of approximately 35000 tracks (cylinders). Furthermore, the magnitude of hysteresis approaches zero as the stroke length approaches zero. The fit curve 202, in essence, is equal to the difference in magnitudes of the direction offset value 190 (second order correction) and the history offset value 192 (third order correction). Thus, with the direction offset value 190 being a constant at a given track location, the fit curve 202 is substantially equivalent to the history offset value 192 (FIG. 8A). Specifically, the history offset value 192 is equal to the asymptotic maximum value minus the fit curve 202 for a given stroke length. In FIG. 9, the asymptotic maximum value is approximately equal to 2 in arbitrary units.

It has been observed that magnitude of hysteresis dependence on the stroke length, such as that depicted in FIG. 9, is similar between two situations wherein a first situation has a stroke comprising a single seek operation in a first direction, and a second situation has the same stroke comprising a plurality of seek operations, each of which are in the first direction. Thus, the quantity that determines the magnitude of hysteresis is the length between points where the seek direction changes. These points where the seek direction changes, is referred to as inflection points, and the distance between the inflection points is referred to as inflection lengths. It will be understood that the inflection point described herein refers to a change in the direction of overall seek operation, and does not include changes in direction of motion of the transducer during the settling phase. Since the transducer moves either inward or outward on the disk, the inflection can occur when the seek changes from inward to outward, or from outward to inward.

TABLE 1 lists a sequence of exemplary seek operations from which exemplary inflection points and inflection lengths are determined.

TABLE 1

| Seek number | Beginning track number | Target track number | Seek length (# of tracks) | Seek direction |
|---|---|---|---|---|
| 1 | 1000 | 3000 | 2000 | outward |
| 2 | 3000 | 10000 | 7000 | outward |
| 3 | 10000 | 10500 | 500 | outward |
| 4 | 10500 | 8000 | 2500 | inward |

TABLE 1-continued

| Seek number | Beginning track number | Target track number | Seek length (# of tracks) | Seek direction |
|---|---|---|---|---|
| 5 | 8000 | 9000 | 1000 | outward |
| 6 | 9000 | 5000 | 4000 | inward |
| 7 | 5000 | 4900 | 100 | inward |
| 8 | 4900 | 4500 | 400 | inward |
| 9 | 4500 | 4000 | 500 | inward |

Assuming that a seek operation prior to seek number 1 is inward, a first inflection point is at track number 1000. Seek operations 1 through 3 are outward, thus a second inflection point is at track number 10500, the target track number of seek number 3. An inflection length corresponding to the second inflection point is thus 2000+7000+500=9500 tracks. A third inflection point is at the target track number 8000 of seek number 4, and its corresponding inflection length is 2500 tracks, the total number of tracks traversed inward. Similarly, a fourth inflection point is at the target track number 9000 of seek number 5, with an inflection length of 1000 tracks. A fifth inflection point is at the target track number of 4000 of seen number 9 (assuming that seek direction changes after seek number 9), with an inflection length of 5000 tracks. It will be appreciated that TABLE 1 is an exemplary seek sequence to illustrate the definition of inflection point and inflection length.

Figure 10A:
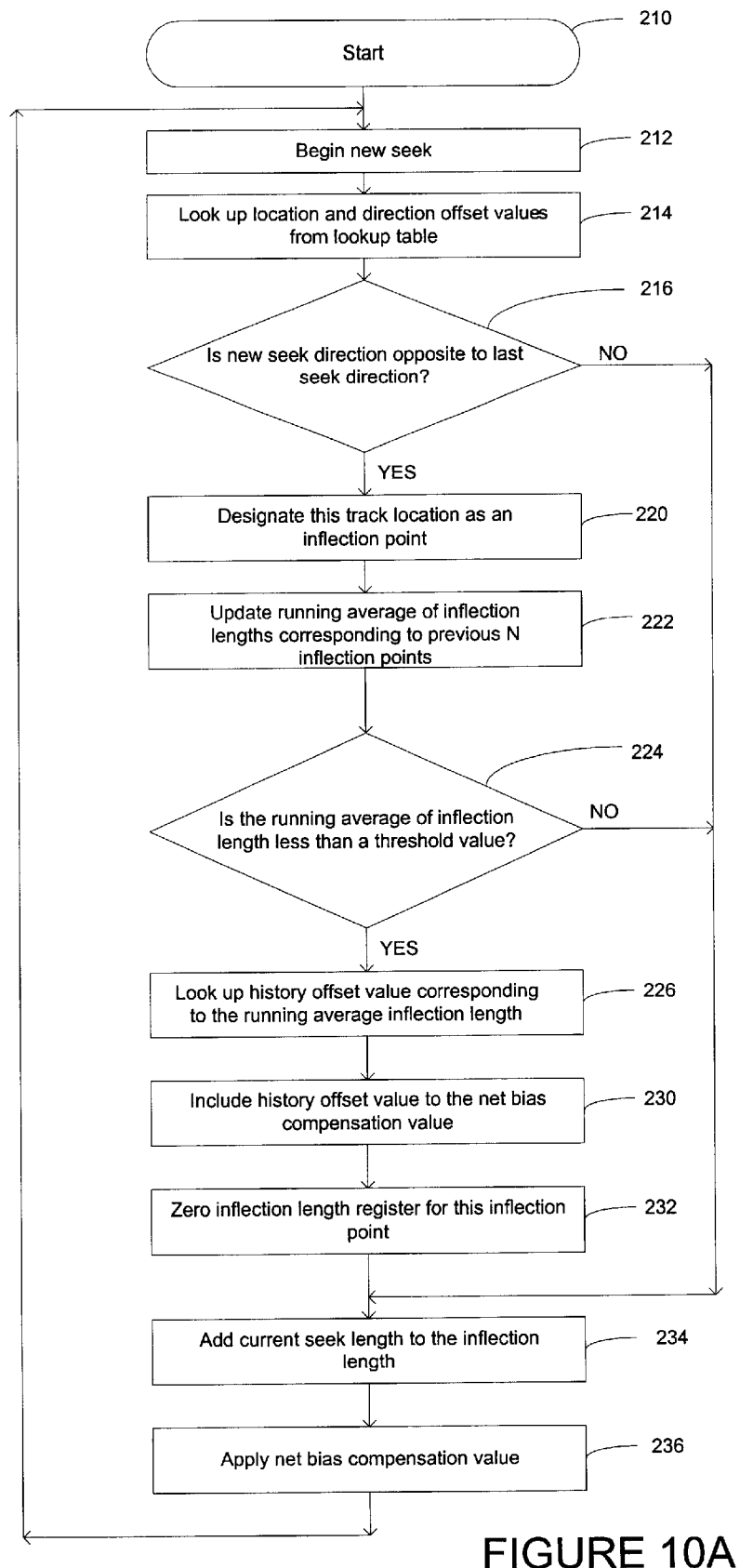
FIG. 10A is a flow chart that illustrates one method of applying the history offset value to the final bias compensation value.
Figure 10B:
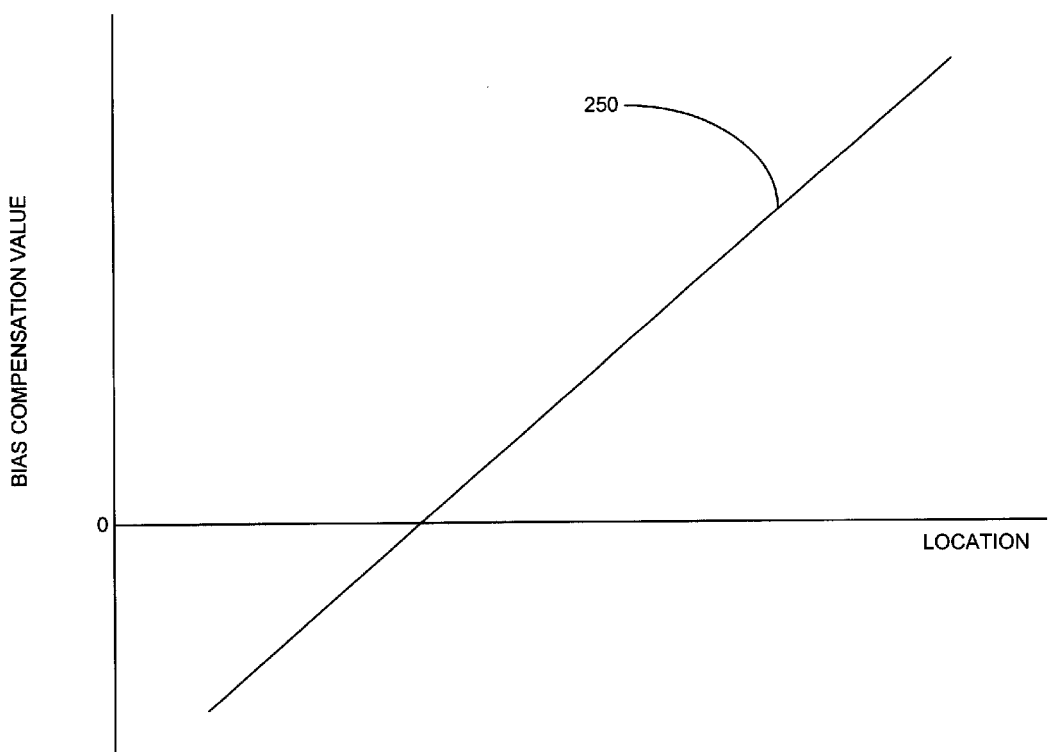
FIG. 10B illustrates an exemplary location offset curve that can be used to form an X-Y lookup table for location dependence.

In one embodiment, the inflection points and inflection lengths are two parameters used to determine whether the history offset value, determined in a manner described above, is implemented or not when determining the net (total) bias compensation value. FIG. 10A illustrates one embodiment of such implementation in the form of a flow chart. Such a logic operation can, for example, be part of the state 132 in FIG. 6, where bias torque compensation value is determined. In FIG. 10A, the logic sequence begins from a start state 210, followed by a state 212 that begins a new seek. In a state 214 that follows, the first order correction (location offset value) and the second order correction (direction offset value) are obtained from lookup tables. The location offset value lookup table is based on a curve 250 illustrated in FIG. 10B, wherein location offset curve is plotted as a function of location, similar to that of FIG. 8A. The direction offset value lookup table is listed in TABLE 2.

TABLE 2

| Seek direction | Direction offset value |
|---|---|
| Outward | +K |
| Inward | −K |

The direction offset value "K" is a constant value at a given track location, but may vary as a function of track location. In one embodiment, the value K is assigned a constant value throughout the range of track numbers, such that the direction offset value lookup table outputs either plus or minus K.

At this stage, the net bias compensation value does not include the history offset value. A logical decision state 216 determines whether the history offset value is to be included in the net bias compensation value or not. The decision state 216 determines whether this new seek (current seek) is in a direction opposite to the last seek direction. If the outcome is a 'no', then the sequence is directed to a state 234 where the current seek length is added to the inflection length corresponding to the previous inflection point.

Figure 10C:
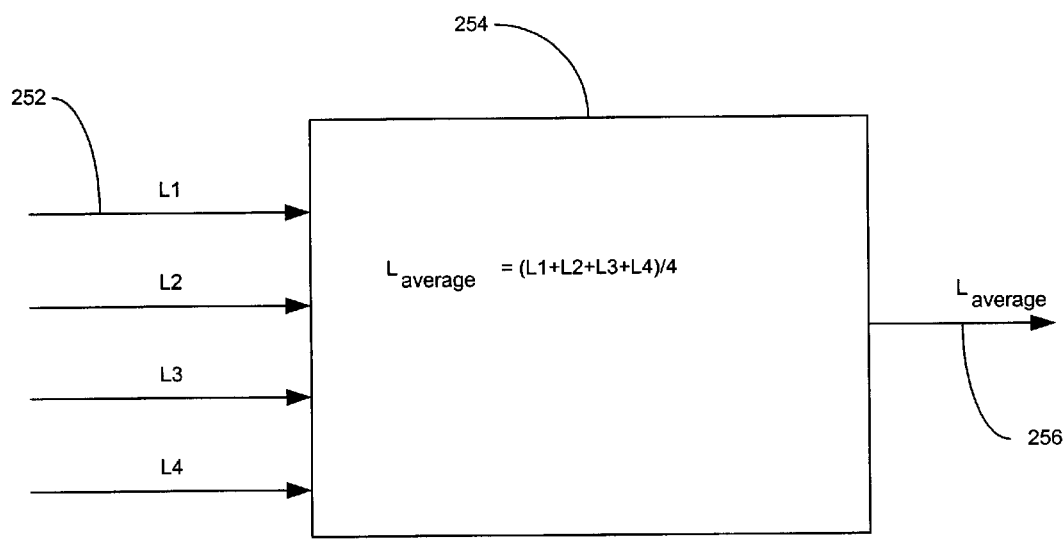
FIG. 10C illustrates an exemplary functional block diagram that averages four inflection lengths to yield an average inflection length.

If the outcome of the decision state 216 is a 'yes', then the present track location (before the new seek) is designated as a new inflection point in state 220. Following the state 220 is a state 222 where a running average of inflection lengths corresponding to previous N inflection points is updated. The number N is a predetermined value, and in one embodiment, is equal to 4. FIG. 10C illustrates a functional block diagram in which the average of N previous inflection lengths is determined. Four inputs 252 of the four previous inflection lengths L1, L2, L3, L4 are input into an averaging unit 254, from which an average inflection length $L_{average}$ comes out as an output 256. The inflection lengths L1 to LN corresponding to the N inflection points can be stored in the register 110 of the controller 102 shown in FIG. 4.

The averaging of the inflection lengths described above in reference to FIG. 10C is one possible exemplary averaging method that can be used to determine a representative inflection length from which the history offset value is obtained. In general, a weighted averaging can be utilized, depending on the implementation of the hard disk drive. One implementation illustrated in FIG. 10C comprises equal weighting of the previous four inflection lengths. In another implementation, it may be desirable to include only the most recent inflection length. In such an implementation, the most recent inflection length is given a weight of 1, and the rest (L2 to LN) are given a weight of 0.

It will further be appreciated that weighted averaging is one possible method of characterizing the history offset value as a function of the inflection length(s) of previous seek operations. Thus, the weighted averaging method described herein is an exemplary function that can be implemented, and is not intended to limit the spirit of the invention.

Figure 10D:
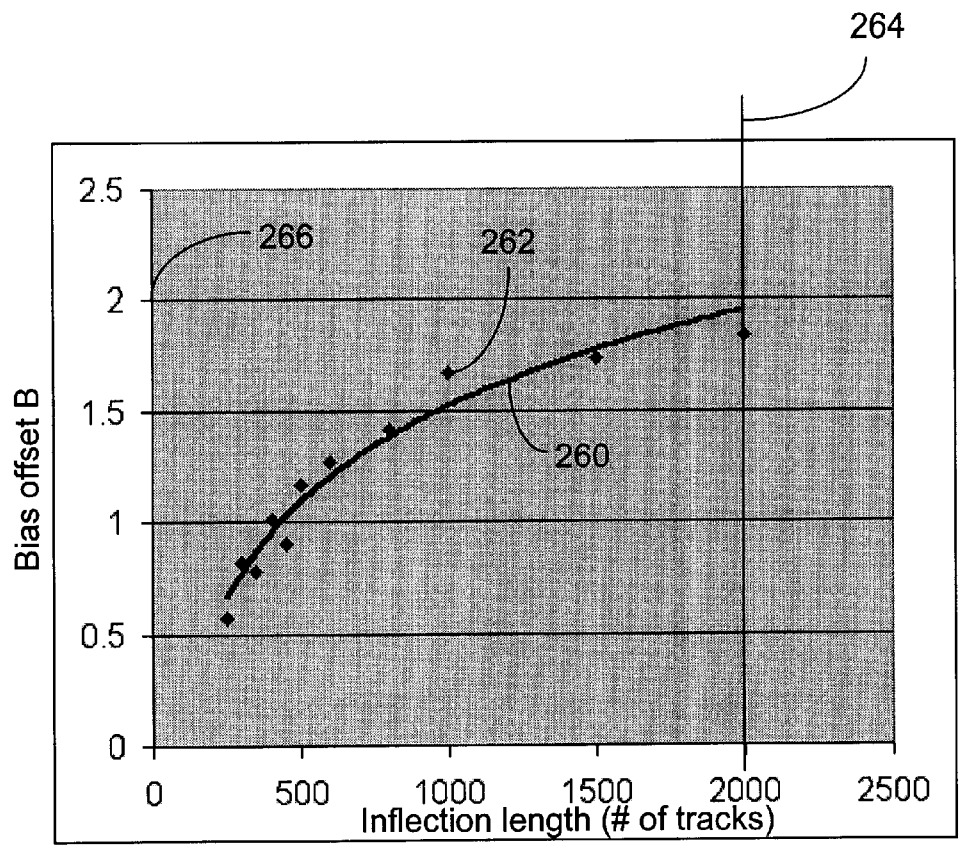
FIG. 10D illustrates one method of determining the history offset value from an X-Y lookup table based on a bias offset curve as a function of inflection length.
Figure 10D:
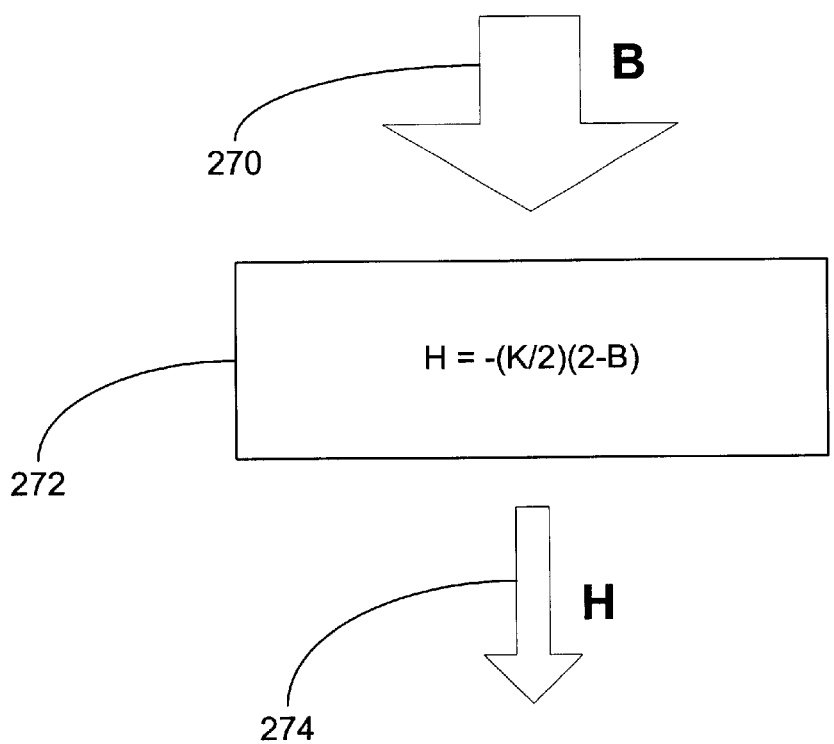

After the running average of the inflection lengths between N inflection points is updated, a decision state 224 determines if the updated running average is less than a predetermined threshold value. In one embodiment, this threshold value is set at 2000 tracks. It will be appreciated that the threshold value of 2000 referred to herein is exemplary, and may vary depending on the hard disk drive implementation. If the outcome is a 'no', then the history offset value is not implemented, and the sequence is directed to the state 234. If the outcome is a 'yes', then the history offset value corresponding to the running average inflection length is obtained in state 226. FIG. 10D illustrates one possible method of obtaining the history offset value based on the average inflection length and the empirically obtained bias torque curve illustrated in FIG. 9.

FIG. 10D illustrates a bias offset "B" curve 260 that is derived from empirical data points 262, plotted as a function of inflection lengths. A threshold 264 is set at 2000 tracks, such that if the average inflection length is greater than 2000 tracks, then no further action is taken to include the history offset value to the net bias compensation value. A X-Y lookup table based on the curve 260 permits determination of the bias offset B given the average inflection length less than or equal to 2000 tracks. As further shown in FIG. 10D, the value of B becomes an input 270 that goes into a calculation block 272 where the history offset value "H" is determined by the formula shown. As referred to above, history offset value is substantially equal to the asymptotic value (2 in this case) minus the bias offset B. The factor K/2 normalizes the history offset value H to the direction offset values "K" described above in reference to TABLE 2. The history offset value H comes out of the calculation block 272 as an output 274.

The history offset value obtained in the state 226 is included in the net bias compensation value in state 230. In a state 232 that follows, the inflection length register is zeroed for the present inflection point.

In state 234, the current seek length is added to the present inflection length. If a new inflection point was just established, then the inflection length was zeroed in the state 232. If this seek is in the same direction as the previous seek, then the state 234 is a continuing point from the 'no' outcome at the decision state 216.

Figure 11:
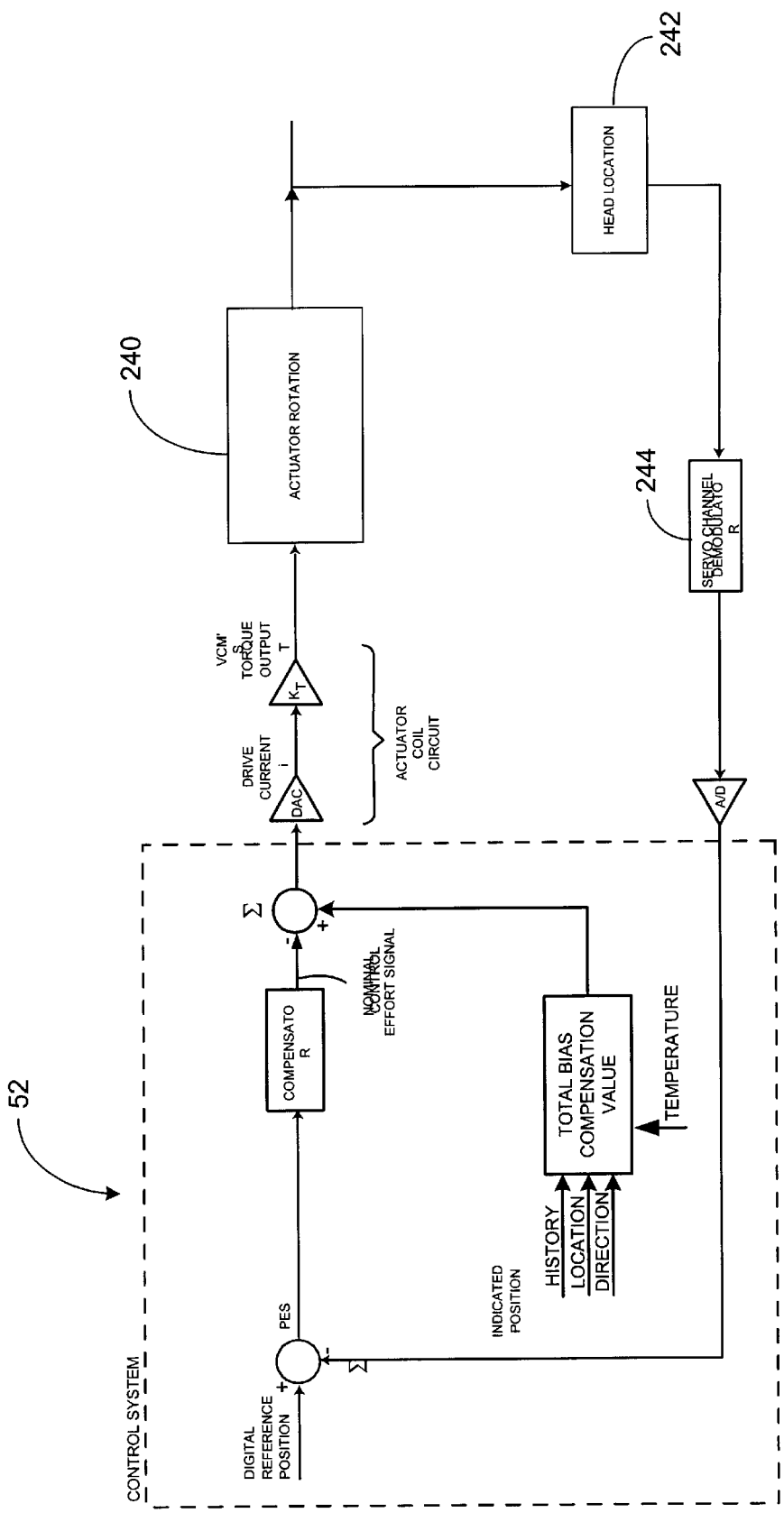
FIG. 11 is a functional block diagram that illustrates application of the final bias compensation value to the actuator so as to offset the bias torque.

In state 236, the net bias compensation value is applied to the control system 52 (FIGS. 4, 11). The sequence returns to the beginning for the next seek operation.

FIG. 11 illustrates a functional block diagram of one embodiment wherein the net (total) bias compensation value is determined in the control system 52, in a manner described above, and applied to the actuator coil circuit to cause a actuator rotation, or resist rotation due to the net bias torque. The head location 242 is concurrently monitored by a servo channel demodulator 244. It will be appreciated that application of signals to the actuator coil circuit, as well as monitoring of the head location, are performed in manner well known in the art.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A hard disk device comprising:
    a rotatable disk having a magnetic recording media wherein the rotatable disk defines a plurality of concentric servo tracks;
    a pivotable actuator that is movable with respect to the rotatable disk wherein the pivotable actuator is subject to a first bias force wherein the first bias force has a history component that varies at least in part, based upon the history of previous movements of the pivotable actuator;
    a transducer positioned on the actuator so as to be movable with respect to the disk so as to be positionable on a selected servo track of the plurality of concentric servo tracks;
    a controller that induces bias outputs to be applied to the pivotable actuator during positioning of the actuator during a selected seek operation wherein the controller induces a first bias output to be applied to the actuator to position the actuator with respect to the rotatable disk so as to position the transducer on a selected servo track of the plurality of servo tracks wherein the controller monitors at least one inflection length that is defined as the total number of tracks traversed during a plurality of seek operations between changes in direction of the pivotable actuator prior to the selected seek operation and determines the magnitude of the first bias output by determining a first magnitude value indicative of the approximate bias needed to position the actuator so as to position the transducer on the selected servo track and then offsetting the first magnitude value by a history offset value that corresponds to the history component of the first bias force exerted on the actuator and wherein the history offset is determined based upon the monitored at least one inflection length.

2. The hard disk device of claim 1, wherein the controller induces the application of the first bias output during a seek operation that moves the transducer from a first position over a first servo track to a second position over a second servo track, wherein the first bias output settles the actuator in the second position such that the transducer is positioned over the second servo track.

3. The hard disk device of claim 2, further comprising a memory having a plurality of location bias values stored therein that is used by the controller to determine the first magnitude value of approximate bias needed to position the actuator so as to move the transducer from the first position over a first servo track to the second position over the second servo track.

4. The hard disk device of claim 3, wherein the memory includes a first X-Y look up table wherein the location bias values are plotted versus location.

5. The hard disk device of claim 4, wherein the location bias value depends on the operating temperature of the hard disk device.

6. The hard disk device of claim 5, wherein parameters that define temperature dependence of the location bias value are stored in the memory as a look up table.

7. The hard disk device of claim 4, wherein the memory includes a direction offset value stored therein that the controller uses to adjust the location bias value in obtaining the magnitude of the first bias output wherein the direction offset value is representative of the direction of movement of the actuator during the selected seek operation.

8. The hard disk device of claim 7, wherein the memory further includes a plurality of history offset values stored therein that are indicative of the offset values used to offset the first magnitude value so as to at least partially offset the history component of the first bias force exerted on the pivotable actuator.

9. The hard disk device of claim 8, wherein the controller uses the location bias value, the direction offset value and the history offset value to obtain the magnitude of the first bias output needed for the selected seek operation.

10. The hard disk device of claim 9, wherein the history offset value reduces the magnitude of the adjustment of the direction offset value to the location bias value for the selected seek operation.

11. The hard disk drive of claim 9, wherein the memory further comprises a second X-Y look up table that correlates the history offset values versus a weighted average of the inflection lengths of the plurality of previous seek operations.

12. The hard disk drive of claim 11, wherein the history offset value plotted versus the weighted average of the inflection lengths has a negative value for at least a portion of the second X-Y look up table so as to diminish the effect of the adjustment of the direction offset value to the location bias value.

13. The hard disk drive of claim 12, wherein the history offset value has a zero magnitude for seek lengths greater than a pre-selected length.

14. The hard disk device of claim 1, wherein the controller induces the application of the first bias output during track following immediately subsequent to the seek operation so as to counteract the first bias force on the pivotable actuator and maintain the transducer in a position over the servo track.

15. The hard disk device of claim 14, further comprising a memory having a plurality of location bias values stored therein that is used by the controller to determine the first magnitude value of approximate bias needed to maintain the actuator over the servo track.

16. The hard disk device of claim 15, wherein the memory includes the first X-Y look up table wherein the location bias values are plotted versus location.

17. The hard disk device of claim 16, wherein the location bias value depends on the operating temperature of the hard disk device.

18. The hard disk device of claim 17, wherein parameters that define temperature dependence of the location bias value are stored in the memory as a look up table.

19. The hard disk device of claim 16, wherein the memory includes a direction offset value stored therein that the controller uses to adjust the location bias value in obtaining the magnitude of the first bias output wherein the direction offset value is representative of the direction of movement of the actuator during the selected previous seek operation.

20. The hard disk device of claim 19, wherein the memory further includes a plurality of history offset values stored therein that are indicative of the offset values used to offset the first magnitude value so as to at least partially offset the history component of the first bias force exerted on the pivotable actuator.

21. The hard disk device of claim 20, wherein the controller uses the location bias value, the direction offset value and the history offset value to obtain the magnitude of the first bias output needed for the selected track following operation.

22. The hard disk device of claim 21, wherein the history offset value reduces the magnitude of the adjustment of the direction offset value to the location bias value for the selected track following operation.

23. The hard disk drive of claim 21, wherein the memory further comprises the second X-Y look up table that correlates the history offset values versus a weighted average of the inflection lengths of the plurality of previous seek operations.

24. The hard disk drive of claim 23, wherein the history offset value plotted versus the weighted average of the inflection lengths has a negative value for at least a portion of the second X-Y look up table so as to diminish the effect of the adjustment of the direction offset value to the location bias value.

25. The hard disk drive of claim 24, wherein the history offset value has a zero magnitude for previous seek lengths greater than a pre-selected length.

26. A method of adjusting the position of an actuator having a transducer positioned thereon with respect to a selected servo track of a rotating hard disk, the method comprising:

assessing a plurality of previous seek operations wherein the actuator has moved the transducer from one servo track to another to determine a history offset value corresponding to a history component of a first bias force exerted on the actuator wherein the history component varies, at least in part, based on the history of a plurality of previous movements of the pivotable actuator occurring prior to a current seek operation;

determining an initial magnitude value of a bias output needed to be applied to the actuator to position the transducer over the selected servo track;

adjusting the initial magnitude value of the bias output by the history offset value to obtain a first bias output; and applying the first bias output to the actuator so as to position the transducer over the selected servo track.

27. The method of claim 26, wherein applying the first bias output to the actuator counteracts the first bias force acting on the actuator during settling of the transducer over the selected servo track during a seek operation, and during track following immediately subsequent to the seek operation.

28. The method of claim 26, wherein determining the initial magnitude value of the bias output comprises determining the initial magnitude value's dependence on the location of the selected servo track and the direction of the seek operation.

29. The method of claim 28, wherein the initial magnitude of the bias output further depends on the operating temperature.

30. The method of claim 26, wherein assessing the plurality of previous seek operations comprises monitoring and weighted averaging at least one inflection length that is defined as total number of tracks traversed during a plurality of seek operations between changes in direction of the actuator.

31. The method of claim 30, wherein weighted average of the inflection lengths is indicative of the history offset value.

* * * * *